No. 883,161. PATENTED MAR. 24, 1908.
E. R. ROSENTRETER.
FOLDING DECOY.
APPLICATION FILED SEPT. 10, 1906.
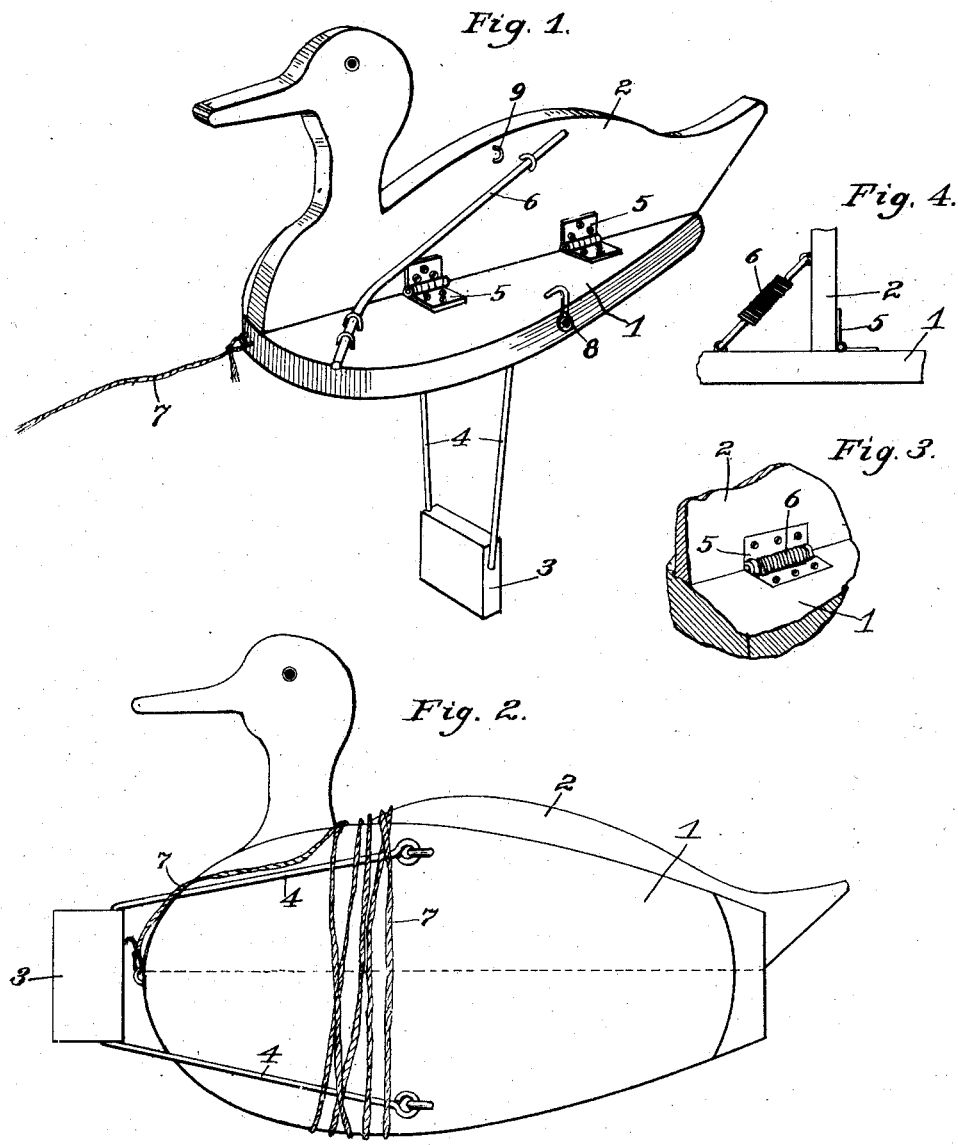
Witnesses:
Geo. H. Morse.
Charles J. Cobb
Inventor:
Emil R. Rosentreter,
By Hill & Hill,
Att'ys.

UNITED STATES PATENT OFFICE.

EMIL R. ROSENTRETER, OF CHICAGO, ILLINOIS.

FOLDING DECOY.

No. 883,161.        Specification of Letters Patent.        Patented March 24, 1908.

Application filed September 10, 1906. Serial No. 333,885.

*To all whom it may concern:*

Be it known that I, EMIL R. ROSENTRETER, a citizen of the United States, residing at Chicago, in the county of Cook and State of Illinois, have invented certain new and useful Improvements in Folding Decoys, of which the following is a description.

My invention belongs to that class of devices known as decoys and has for its object the production of a cheap, simple, convenient and compact form of decoy for the purpose set forth. The decoy may be folded up and packed taking up but a small portion of room when the same is shipped or being carried. Upon arriving at the place where it is desired to use the same, the decoy may be thrown out and the parts automatically assume their operative positions.

To this end my invention consists in the novel arrangement construction and combination of parts herein shown and described and more particularly pointed out in the claims.

In the drawings wherein like reference characters indicate like or corresponding parts, Figure 1 is a perspective view of my improved form of folding decoys. Fig. 2 is a bottom view of the same showing the decoy folded for packing. Fig. 3 is a partial perspective view of my preferred device showing a modified form of resilient member. Fig. 4 is a partial sectional view of the same showing another modified form of resilient member.

As is shown in the drawings my preferred form of decoy consists of a base or float 1 to which is pivotally secured the upper part 2 of the decoy by means of hinges 5 or their equivalent and so arranged as to collapse or fold down. It is obvious that the part 2 may be made any shape, form or design suitable for the use for which the decoy is to be put. When in use the part 2 is open or up as shown in Fig. 1 and preferably resiliently maintained in its position by the member 6. As is obvious, this resilient member 6 may be of the form as shown in Figs. 1, 3 or 4 or any other form suitable for accomplishing the purpose as set forth. On the under part of the float 1 is preferably arranged a weight 3 or its equivalent supported by the wires 4 or their equivalent, adapted to keep the decoy in operative position in the water. Any other suitable or preferred means may be employed for this purpose.

A cord 7 or its equivalent may be attached to the float member in any suitable or preferred place for anchoring the same or attaching to other decoys. This cord is preferably attached to the decoy at a point where the action of the wind will cause the decoy to "tack" or move around.

When packed for carrying or shipping the decoy is folded as shown in Fig. 2 and the cord 7 preferably wrapped round holding the same in its closed position. When it is desired to use the decoy the cord 7 is unwound and the decoy thrown into the water. The part 2 automatically springs into its operative position as shown in Fig. 1, the weight or balancing member 3 dropping into position as is also shown in Fig. 1. It is obvious that in this construction I have a decoy that is simple and compact when folded but may be made ready for use in an instant without any adjustment or assembling of parts. When the parts are made in the preferred shapes or form shown in the drawings the same appears as a full sized living object whether viewed from above or at an inclination.

Having thus described my invention it is obvious that various immaterial modifications may be made in the form and arrangement shown, hence I do not wish to be understood as limiting myself to the exact design or construction shown.

What I claim and desire to secure by Letters Patent is,

A folding decoy of the kind described, comprising a float member and an upright member pivotally secured thereto on an axis longitudinal of the float member, means tending normally to resiliently hold the upright member in operative position substantially at a right angle to the transverse axis of the float, means for temporarily holding the upright member in its folded position as desired substantially in a plane parallel to the plane of the float, and folding balancing means arranged on the under part of said float to maintain the upright member in operative position above the water.

In testimony whereof, I have hereunto signed my name in the presence of two subscribing witnesses.

EMIL R. ROSENTRETER.

Witnesses:
    ROY W. HILL,
    CHARLES I. COBB.